US007934586B1

(12) United States Patent
Black

(10) Patent No.: US 7,934,586 B1
(45) Date of Patent: May 3, 2011

(54) VENTED ROTOR

(75) Inventor: David Reed Black, Commerce, MI (US)

(73) Assignee: Robert Bosch GmbH, Stuttgart (DE)

( * ) Notice: Subject to any disclaimer, the term of this patent is extended or adjusted under 35 U.S.C. 154(b) by 1101 days.

(21) Appl. No.: 11/679,713

(22) Filed: Feb. 27, 2007

(51) Int. Cl.
*F16D 65/10* (2006.01)

(52) U.S. Cl. .................................... 188/218 XL

(58) Field of Classification Search ............ 188/218 XL, 188/18 A
See application file for complete search history.

(56) References Cited

U.S. PATENT DOCUMENTS

| 2,243,334 | A | * | 5/1941 | Eksergian ............... | 188/218 XL |
| 2,358,134 | A | * | 9/1944 | Tack ....................... | 188/218 XL |
| 2,627,325 | A | * | 2/1953 | Helsten ................... | 188/218 XL |
| 4,448,291 | A | * | 5/1984 | Ritsema et al. ......... | 188/218 XL |
| 4,928,798 | A | * | 5/1990 | Watson et al. .......... | 188/218 XL |
| 6,164,423 | A | | 12/2000 | Dickerson | |
| 6,550,590 | B1 | | 4/2003 | Ranganathan | |
| 2005/0269174 | A1 | * | 12/2005 | Lin ......................... | 188/218 XL |

* cited by examiner

*Primary Examiner* — Bradley T King
(74) *Attorney, Agent, or Firm* — Maginot, Moore & Beck

(57) ABSTRACT

A disc brake rotor having a central hat portion for coupling a rotor to a vehicle wheel for rotation about a central axis, an inboard brakeplate for receiving a first friction surface and an outboard brakeplate for receiving a second friction surface. A plurality of L-shaped rib members extends from the hat for coupling the inboard brakeplate to the hat and a second plurality of L-shaped members radially extend from the hat for coupling the outboard brakeplate to the hat. First plurality of ribs is longer than the second plurality of ribs. The second set L-shaped members is located intermediate of the edges of the inboard and outboard pluralities to enhance the heat transfer of the braking operation.

11 Claims, 4 Drawing Sheets

US 7,934,586 B1

VENTED ROTOR

The present invention relates to vehicle braking systems of the disc variety, and more particularly to a disc brake rotor having improved performance features including enhanced heat transfer capability.

BACKGROUND OF THE INVENTION

Conventional vehicle disc brakes employ a rotor fixed to and rotatable with a vehicle wheel having a pair of planar annular friction faces for receiving the pads of a spanning caliper mechanism. The rotor may be formed with a central hub or hat section for attachment to a wheel and two radially extending plates interconnected by ribs to allow airflow radially between the plates to better dissipate the heat generated during braking.

The conventional brake rotor design connects the braking surfaces to the hat section of the rotor via the outboard brake plate. Under elevated temperature usage the difference in thermal stress between the inboard and outboard brake plate causes a coning effect that distorts the brake plate surfaces resulting in non-uniform contact with the brake linings. One design solution implemented to reduce this thermal distortion is to connect the hat section to the inboard brake plate. The detriment to implementing this approach is that air cooling is reduced by closing off the ability of the vanes between the brake plates to dissipate the heat.

The optimal solution to balancing the thermal stress on the brake plates is to connect the brake plates to the hat section by the vanes. It has been asserted that the air flow through the vanes in this approach is comparable to the conventional brake plate attachment. One approach to this attachment method is shown in U.S. Pat. No. 6,164,423 which suggests a radially vented disc brake or similar rotor having inner and outer friction ring sections joined to one another and to a radially inner hub or hat section by a plurality of radially extending ribs or webs. Interspersed between these mounting ribs are another plurality of rib sections which join the ring sections to one another, but do not extend radially inwardly to join the ring sections to the hub. Each member of the first set of ribs function as a mounting rib interconnecting both ring sections with the hub while each rib of the latter set functions only to maintain separation or spacing of the ring sections. Cooling air may flow radially between one rib of each set. In another embodiment, there are two spacing ribs between each pair of mounting ribs and air may flow radially between one rib of each set as well as between two adjacent spacing ribs.

In U.S. Pat. No. 6,550,590 there is disclosed double venting arrangement for cooling a disc brake rotor. A central hub or hat section supports a solid support ring which, in turn, has vanes axially extending from each of its opposed faces to engage and support inboard and outboard braking rings or cheeks. One embodiment has the vanes on opposite sides of the support ring aligned with one another while another embodiment shows the vanes staggered with the vanes of one face angularly displaced from those of the other face by about one-half the angular spacing between adjacent vanes. In a third embodiment, the brake plates and support ring are slanted so that the air flow path is in a combined axial and radial direction. The patent suggests undercutting a hat surface region radially inward of the rings or brake plates axially close to the ribs to increase air flow into the vents between adjacent ribs.

Both of these patented arrangements have individual air flow paths adjacent ones of which are separated from one another by a mounting rib or vane.

It is desirable to provide an enhanced air flow path without deleteriously affecting structural integrity. It is also desirable to minimize thermally induced distortions such as coning without adversely reducing heat dissipation.

SUMMARY OF THE INVENTION

The present invention provides a unique connection of the brake plates to improve the airflow between the plates by connecting both the inner and outer plates independently to the hat section. The benefits of this connection method can be realized in reduced thermal coning. The deflection of the brake plates towards each other in a clamped brake can be tuned to match the mechanical stiffness of the caliper. This may benefit the brake by minimizing radial taper wear within the brake linings. Alternate constructions of the attachment method are also provided.

An objective of this invention is to provide a unique method of attaching the rotor brake plates to the hat section to improve heat transfer capability by opening the vent area from the inside diameter to the outside diameter.

Another objective is to reduce thermally induced rotor distortions.

The invention comprises, in one form thereof, a rotor for a disc brake system having inboard and outboard annular brake plates and a generally cylindrical hat portion with a partially closed end for attachment to a vehicle wheel and a sidewall portion terminating in a plurality of brake plate attachment ribs. A first set of the plurality of ribs join the hat portion to the inboard plate and a second set of the plurality of ribs join the hat portion to the outboard plate. The first and second sets of ribs have no ribs in common, that is, they are disjoint, with the first set of ribs spaced from the outboard plate to form radial air flow paths and the second set of ribs spaced from the inboard plate to form further radial air flow paths. The number of ribs in the first and second sets of ribs are the same with one rib of the first set being located radially between an adjacent pair of ribs of the second set and one rib of the second set being located radially between an adjacent pair of ribs of the first set. In one modification, there are also a first set of strengthening posts for joining respective ribs of the first set of ribs to the outboard plate, and a second set of strengthening posts for joining respective ribs of the second set of ribs to the inboard plate.

An advantage of the present invention is that cooling air flow is enhanced without unduly sacrificing structural integrity.

Another advantage is that mechanical stability particularly the resistance to heat induced distortion is improved.

BRIEF DESCRIPTION OF THE DRAWINGS

Corresponding reference characters indicate corresponding parts throughout the several drawing views.

DETAILED DESCRIPTION OF THE INVENTION

Figure 1:
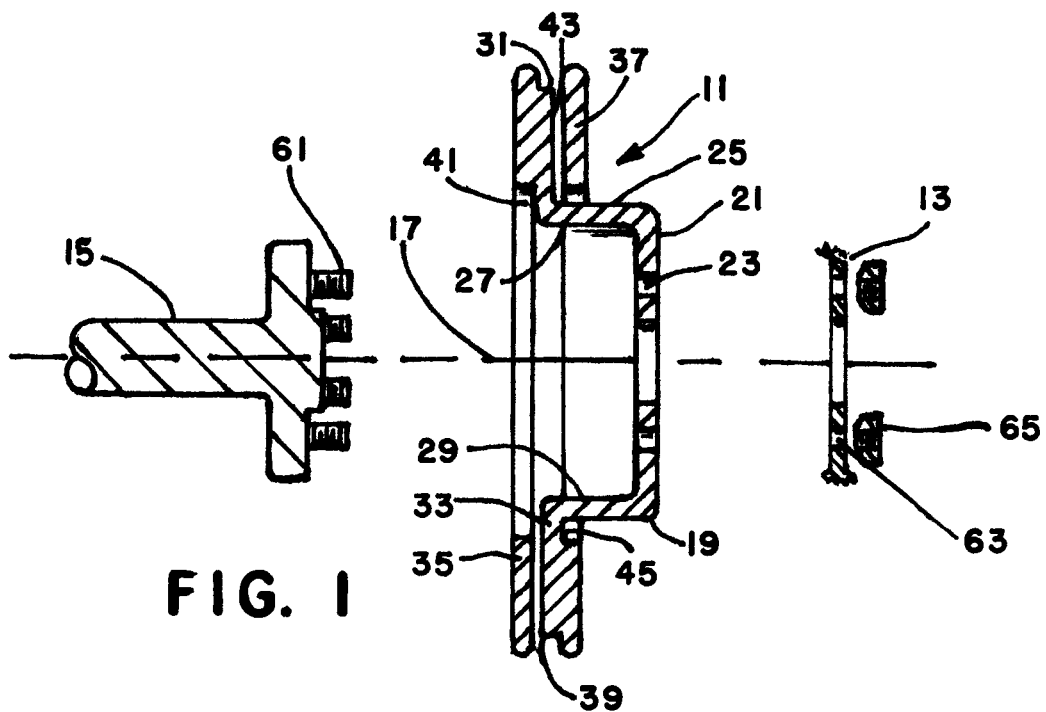
FIG. 1 is an exploded simplified side elevation view, partially in cross-section, of a vehicle axle, brake and wheel assembly.

Referring now to the drawings and particularly to FIG. 1, there is shown, in exploded cross-section, a simplified illustration of a vehicle axle 15, brake component 11 and a portion of a vehicle wheel 13. The wheel 13 and brake component 11 are assembled to the axle 15 by passing the wheel bolts such as 61 through brake component openings such as 23 and corresponding wheel openings 63 to thereafter receive lug nuts such as 65 as is conventional. FIG. 1 is simplified showing only two lug nuts 65, however it is common to employ four to six or more wheel bolts and lug nuts. Brake component 11 is a rotor for a disk brake system having inboard 47 and outboard 49 braking surfaces to which spanning rotationally fixed brake friction pads (not shown) are selectively applied to brake vehicle wheel rotation. Rotor 11 includes a hub or hat portion 19 having a central plate 21 with a plurality of threaded fastener openings 23 for attaching the component to vehicle wheel 13 and a generally cylindrical sidewall portion 25 extending axially parallel to axis 17 from the central plate and terminating in first 51, 53, 55 and second 57, 59 sets of angular ribs. Each rib is generally L-shaped having an axially extending rib portion 27 or 29 and a radially extending rib portion 31 or 33. FIG. 1 is simplified showing only one rib of each set, but numerous ribs are seen in FIGS. 2-6. An annular inboard brake plate 35 has a pair of flat generally parallel faces with the inboard brake plate face 47 forming the inboard braking surface and the other inboard brake plate face connected to radially extending rib portions such as 31 of the first set of ribs. An annular outboard brake plate 37 has a pair of flat generally parallel faces, one outboard brake plate face forming the outboard braking surface 49 and the other outboard brake plate face connected to radially extending rib portions such as 33 of the second set of ribs.

FIG. 1 shows the radial portion 31 of the rib which engages the inboard brake plate 35 located further to the left than radial portion 33 of the rib which supports outboard brake plate 37. This is caused by the axial rib portion 27 being longer than the axial rib portion 29. As seen in FIGS. 2-6, the axially extending rib portion of each rib of the first set of ribs which support the inboard plate 35 is longer than the axially extending rib portion of any rib in the second set of ribs which support the outboard plate 37.

Figure 6:
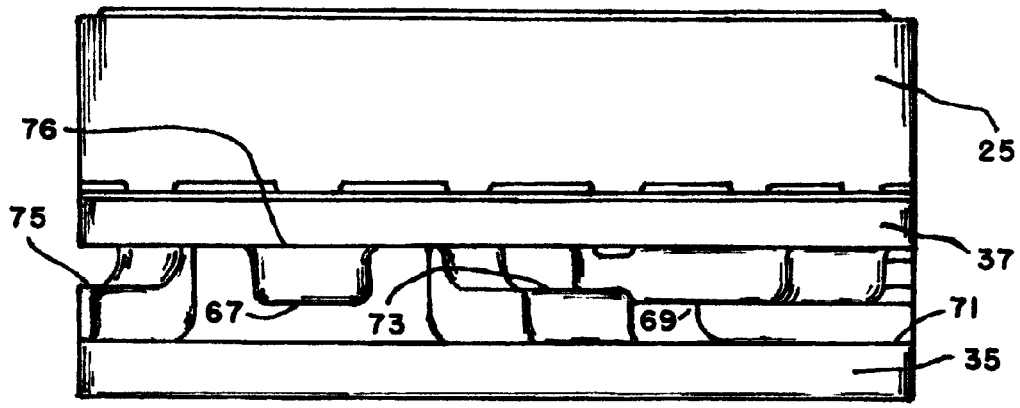
FIG. 6 is an edge view of a portion of the rotor of FIGS. 1-3 showing the air flow area between plates.
Figure 8:
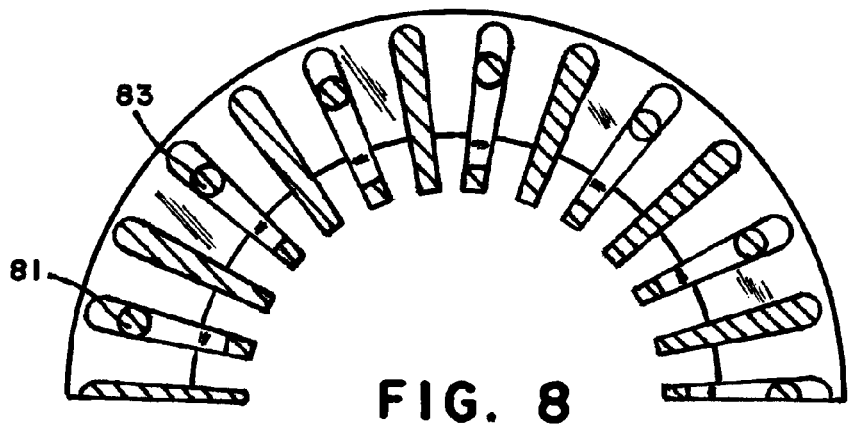
FIG. 8 is a top view of the rotor portion of FIG. 7 with the outboard plate removed.
Figure 7:
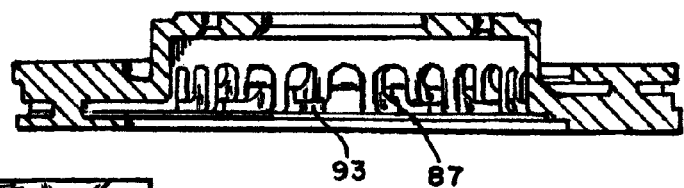
FIG. 7 is a side elevation view in cross-section of a rotor similar to FIG. 3, but illustrating one variation on the present invention.
Figure 9:
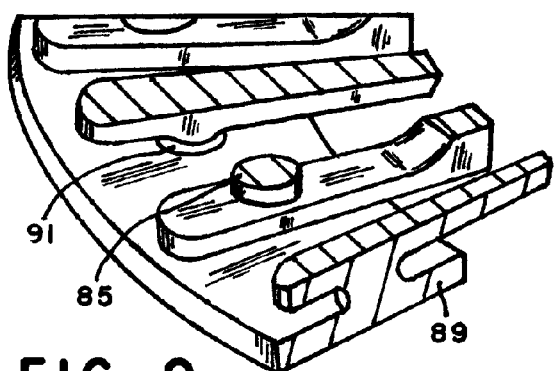
FIG. 9 is an isometric view of a portion of the rotor of FIGS. 7 and 8 with the outboard plate removed.
Figure 11:
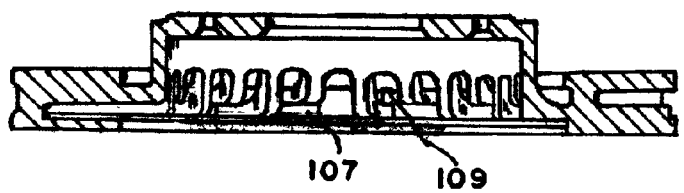
FIG. 11 is a side elevation view in cross-section of a rotor similar to those of FIGS. 3 and 7, but illustrating another variation on the present invention.
Figure 13:
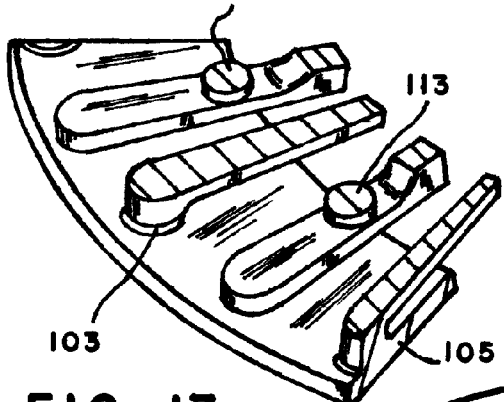
FIG. 13 is an isometric view of a portion of the rotor of FIGS. 11 and 12 with the outboard plate removed.
Figure 12:
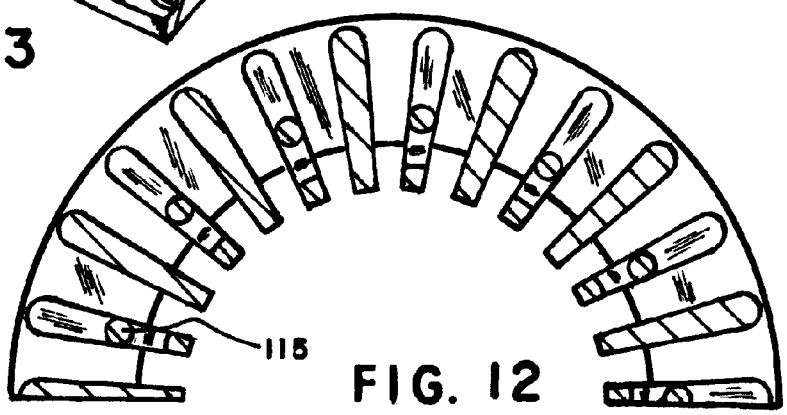
FIG. 12 is a top view of the rotor portion of FIG. 11 with the outboard plate removed.

As best seen in FIGS. 1 and 6, the axially inboard extremity 39, 67 and 69 of each rib in the second set of ribs which support the outboard rotor plate 37 is located axially intermediate the axially inboard 41 or 71 and outboard 43 or 73 extremities of the radially extending portion of every rib in the first set and the axially outboard extremity 73 75 and 79 of the radially extending portion of each rib in the first set of ribs is located axially intermediate the axially inboard 39, 67 or 69 and outboard 45, 76 or, 77 extremities of the radial portions of every rib in the second set of ribs. Note the enhanced air flow region between the plates 35 and 37 in FIG. 6 wherein the radially extending rib portion of each rib 57 or 59 in the second set is spaced from the other inboard brake plate 35 face and the radially extending rib portion of each rib of the first set is spaced from the other outboard brake plate 37 face.

Figure 10:
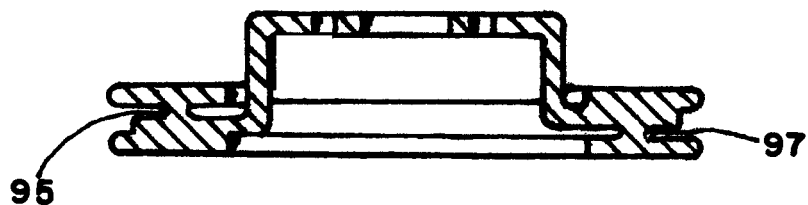
FIG. 10 is a simplified side elevation view, in cross-section, of the rotor of FIGS. 7-9.
Figure 14:
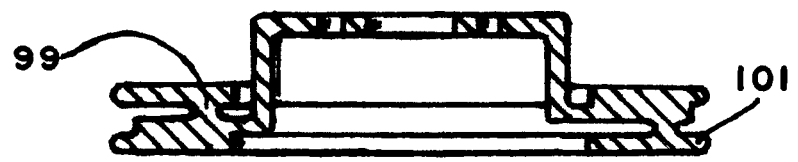
FIG. 14 is a simplified side elevation view, in cross-section, of the rotor of FIGS. 11-13.
Figure 2:
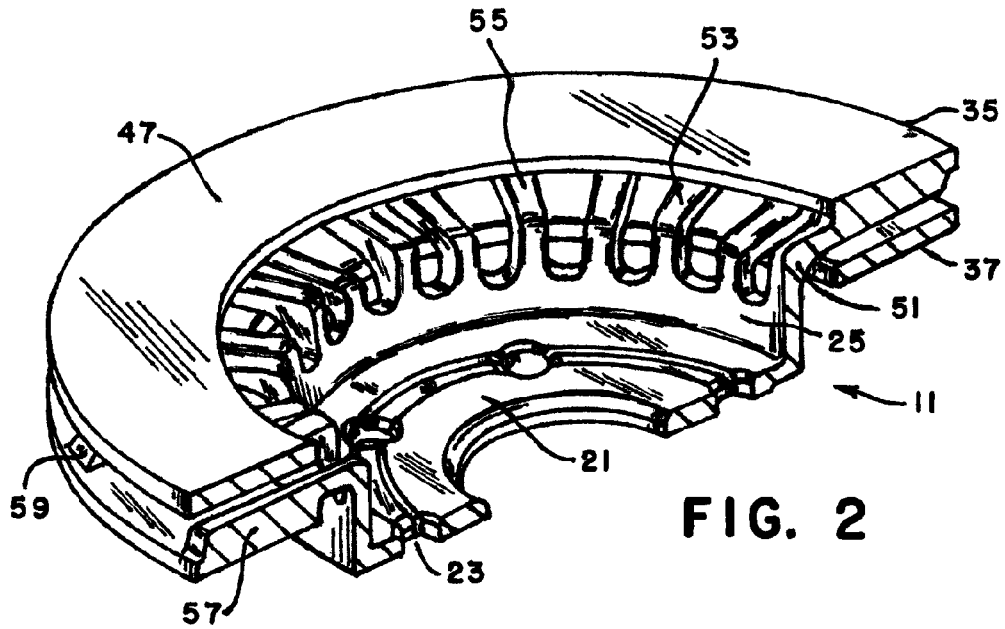
FIG. 2 is a partially cut away isometric view of the brake rotor of FIG. 1.
Figure 3:
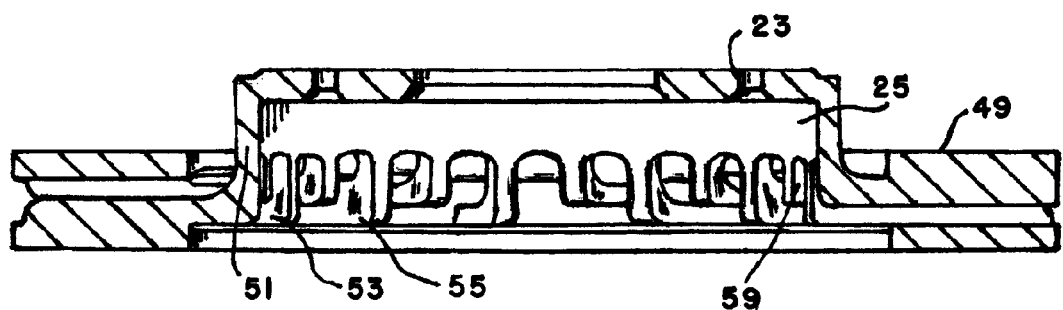
FIG. 3 is a side elevation view of the rotor of FIGS. 1 and 2 in cross-section.
Figure 4:
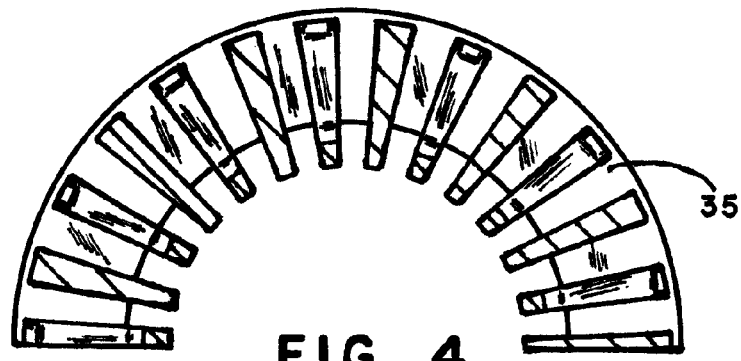
FIG. 4 is a top view of the rotor portion of FIGS. 2 and 3 with the outboard plate removed.
Figure 5:
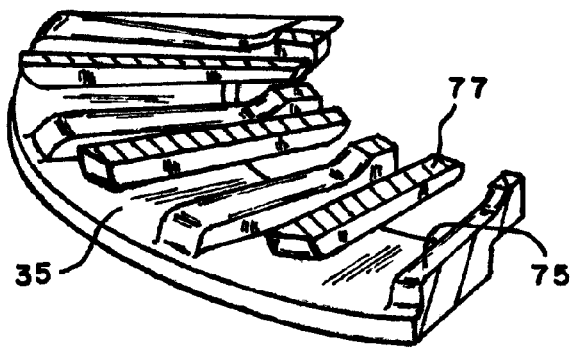
FIG. 5 is an isometric view of a portion of the rotor of FIGS. 2 and 3 with the outboard plate removed.

Turning now to FIGS. 7-10, there is shown a variation on the thus far discussed brake rotor construction which includes a first circular array of strengthening posts such as 81, 83, 85, 87 or 95 each extending axially from a rib of the first set to engage the other outboard brake plate face and a second circular array of strengthening posts such as 89, 91, 93 or 97 each extending axially from a rib of the second set to engage the other inboard brake plate face. In FIGS. 7-10, the first and second circular arrays are of substantially the same radius with the strengthening posts of one array interleaved with the strengthening posts of the other array. Again, for ease of understanding, only two ribs are shown in FIG. 10.

Another variation on the brake rotor construction is seen in FIGS. 11-14. Here, one circular array of strengthening posts including 101, 103, 105 and 107 is located near the radially outer extremity of a plates and the other circular array including 99, 109, 111, 113, or 115 is located near the radially inner extremity of a plates. Thus, in FIGS. 11-14, the annular inboard and outboard brake plates have substantially the same inner and outer diameters, and one circular array including 101, 103, 105 and 107 is located near the outer diameter and the other circular array including posts 99, 109, 111, 113, or 115 is located near the inner diameter.

When comparing this approach to a traditional outboard plate attached rotor with uniform ribs between brake plates, it was determined that several improvements could potentially be realized with the proposed concept. The effective rotor mass can be reduced by about 16% while the wetted surface area which facilitates convective cooling will decrease by only 2%. More significantly, the vent inlet area can increase to 215% its former value and the vent outlet area can be increased to about 160% the traditional rotor design value.

The primary conclusion drawn from the above mentioned data is that the concept provides a means to reduce the part weight significantly without changing the wetted surface area. Furthermore, the inlet and outlet vent area which provides convective cooling is substantially increased. This will benefit the brake with cooler operating temperatures.

Thus, while a preferred embodiment has been disclosed, numerous modifications will occur to those of ordinary skill in this art. Accordingly, the scope of the present invention is to be measured by the scope of the claims which follow.

What is claimed is:

1. A vehicle brake component fixed to and rotatable with a vehicle wheel about a vehicle axle axis having inboard and outboard braking surfaces to which spanning rotationally fixed brake friction pads are selectively applied to brake vehicle wheel rotation, comprising:

a hub portion having a central plate with a plurality of fastener openings for attaching the component to a vehicle wheel and a generally cylindrical sidewall portion extending axially from the central plate, and terminating in first and second sets of angular ribs, each rib having an axially extending rib portion and a radially extending rib portion;

an annular inboard brake plate having a pair of flat generally parallel faces, one inboard brake plate face forming the inboard braking surface and other inboard brake plate face connected to radially extending rib portions of the first set; and an annular outboard brake plate having a pair of flat generally parallel faces, one outboard brake plate face forming the outboard braking surface and the other outboard brake plate face connected to radially extending rib portions of the second set, wherein the axially inboard extremity of the radially extending portion of each rib in the second set of ribs is located axially intermediate the axially inboard and outboard extremities of the radially extending portion of every rib in the first set and the axially outboard extremity of the radially extending portion of each rib in the first set of ribs is located axially intermediate the axially inboard and outboard extremities of the radially extending portion of every rib in the second set of ribs.

2. A vehicle brake component fixed to and rotatable with a vehicle wheel about a vehicle axle axis having inboard and outboard braking surfaces to which spanning rotationally fixed brake friction pads are selectively applied to brake vehicle wheel rotation, comprising:

a hub portion having a central plate with a plurality of fastener openings for attaching the component to a vehicle wheel and a generally cylindrical sidewall portion extending axially from the central plate, and terminating in first and second sets of angular ribs, each rib having an axially extending rib portion and a radially extending rib portion;

an annular inboard brake plate having a pair of flat generally parallel faces, one inboard brake plate face forming the inboard braking surface and other inboard brake plate face connected to radially extending rib portions of the first set;

an annular outboard brake plate having a pair of flat generally parallel faces, one outboard brake plate face forming the outboard braking surface and the other outboard brake plate face connected to radially extending rib portions of the second set; and a first circular array of strengthening posts, each extending axially from a rib of the first set to engage the other outboard brake plate face and a second circular array of strengthening posts, each extending axially from a rib of the second set to engage the other inboard brake plate face.

3. The vehicle brake component of claim 2, wherein the first and second circular arrays are of substantially the same radius with the strengthening posts of one array interleaved with the strengthening posts of the other array.

4. The vehicle brake component of claim 2, wherein one circular array is located near the radially outer extremity of a plates and the other circular array is located near the radially inner extremity of a plates.

5. The vehicle brake component of claim 2, wherein annular inboard and outboard brake plates have substantially the same inner and outer diameters, and one circular array is located near the outer diameter and the other circular array is located near the inner diameter.

6. A rotor for a disc brake system, comprising:
inboard and outboard annular brake plates; and
a generally cylindrical hat portion having a partially closed end for attachment to a vehicle wheel and a sidewall portion terminating in a plurality of brake plate attachment ribs, a first set of the plurality of ribs joining the hat portion to the inboard plate and a second set of the plurality of ribs joining the hat portion to the outboard plate, further comprising a plurality of strengthening posts, one strengthening post extending from each of the first set of ribs to the outboard plate and one strengthening post extending from each of the second set of ribs to the inboard plate.

7. A rotor for a disc brake system, comprising:
inboard and outboard annular brake plates; and
a generally cylindrical hat portion having a partially closed end for attachment to a vehicle wheel and a sidewall portion terminating in a plurality of brake plate attachment ribs, a first set of the plurality of ribs joining the hat portion to the inboard plate and a second set of the plurality of ribs joining the hat portion to the outboard plate, further comprising a first set of strengthening posts for joining respective ribs of the first set of ribs to the outboard plate, and a second set of strengthening posts for joining respective ribs of the second set of ribs to the inboard plate.

8. The rotor of claim 7, wherein one of the sets of strengthening posts is located in a generally circular array near a radially outer edge of one of the plates and the other set of strengthening posts is located in a generally circular array near a radially inner edge of one of the plates.

9. The rotor of claim 7, wherein both of the sets of strengthening posts are located in a common generally circular array intermediate radially inner and outer edges of one of the plates.

10. In a disc brake rotor of the type having a central hat portion for coupling the rotor to a vehicle wheel for rotation therewith about a central axle axis, a generally annular inboard brake plate having an inboard brake pad receiving friction surface, and a generally annular outboard brake plate having an outboard brake pad receiving surface, the improvement comprising first and second disjoint sets of webs extending radially from the hat portion for fixing the inboard and outboard brake plates respectively to the central hat portion, the first set of webs coupling the hat portion exclusively to the inboard brake plate and the second set of ribs coupling the hat portion exclusively with the outboard brake plate, wherein the axially inboard extremity of each web of the second set is located axially intermediate the inboard and outboard extremities of each web of the first set, and the axially outboard extremity of each web of the first set is located axially intermediate the inboard and outboard extremities of each web of the second set.

11. In a disc brake rotor of the type having a central hat portion for coupling the rotor to a vehicle wheel for rotation therewith about a central axle axis, a generally annular inboard brake plate having an inboard brake pad receiving friction surface, and a generally annular outboard brake plate having an outboard brake pad receiving surface, the improvement comprising first and second disjoint sets of webs extending radially from the hat portion for fixing the inboard and outboard brake plates respectively to the central hat portion, the first set of webs coupling the hat portion to the inboard brake plate and the second set of ribs coupling the hat portion with the outboard brake plate, further includes a plurality of strengthening posts extending from at least some of the webs associated with one brake plate to engage the other brake plate.

* * * * *